United States Patent
Xu et al.

(10) Patent No.: US 12,291,643 B2
(45) Date of Patent: May 6, 2025

(54) AQUEOUS COATING COMPOSITION AND PROCESS FOR PREPARING THE SAME

(71) Applicants: Dow Global Technologies LLC, Midland, MI (US); Rohm and Haas Company, Collegeville, PA (US)

(72) Inventors: Jianming Xu, Shanghai (CN); Wei Cui, Shanghai (CN); Yunfei Lan, Shanghai (CN); Cuilan Chang, Shanghai (CN)

(73) Assignees: DOW GLOBAL TECHNOLOGIES LLC, Midland, MI (US); ROHM AND HAAS COMPANY, Collegeville, PA (US)

( * ) Notice: Subject to any disclaimer, the term of this patent is extended or adjusted under 35 U.S.C. 154(b) by 554 days.

(21) Appl. No.: 17/783,485

(22) PCT Filed: Dec. 26, 2019

(86) PCT No.: PCT/CN2019/128589
§ 371 (c)(1),
(2) Date: Jun. 8, 2022

(87) PCT Pub. No.: WO2021/128135
PCT Pub. Date: Jul. 1, 2021

(65) Prior Publication Data
US 2023/0015834 A1    Jan. 19, 2023

(51) Int. Cl.
*C09D 133/08*    (2006.01)
(52) U.S. Cl.
CPC .................. *C09D 133/08* (2013.01)
(58) Field of Classification Search
CPC .................................... C09D 133/08
USPC ........................................ 524/218
See application file for complete search history.

(56) References Cited

U.S. PATENT DOCUMENTS

| | | |
|---|---|---|
| 6,040,368 A | 3/2000 | Maver et al. |
| 6,433,116 B2 | 8/2002 | Culbertson et al. |
| 8,790,632 B2 | 7/2014 | Arthur |
| 10,703,918 B2 | 7/2020 | Fan et al. |
| 2012/0148858 A1 | 6/2012 | Wu |
| 2014/0128537 A1 | 5/2014 | Maddox et al. |
| 2018/0079851 A1 | 3/2018 | Killilea |
| 2018/0194948 A1* | 7/2018 | Fan ..................... C08F 220/286 |
| 2019/0185618 A1 | 6/2019 | Zhou et al. |
| 2020/0262954 A1 | 8/2020 | Dong et al. |

FOREIGN PATENT DOCUMENTS

| | | | |
|---|---|---|---|
| EP | 0390370 A1 | 10/1990 | |
| EP | 916707 A1 * | 5/1999 | ......... C09D 133/062 |
| EP | 0916707 B1 | 2/2003 | |
| WO | 2015110403 A1 | 7/2015 | |
| WO | 2019101556 | 5/2019 | |

OTHER PUBLICATIONS

Supplementary European Search Report from corresponding European Application No. 19957571.3 dated Jul. 26, 2023.
Brandrup, "Polymer Handbook", Interscience Publishers, 1990, vol. 23, pp. 277-280.
Fox, Bull. Am. Physics Soc., 1956, vol. 0 1, Issue No. 3, p. 123.

* cited by examiner

*Primary Examiner* — Kelechi C Egwim
(74) *Attorney, Agent, or Firm* — CANTOR COLBURN LLP

(57) ABSTRACT

A storage stable aqueous coating composition comprising a novel combination of an anionic acrylic polymer with a small amount of a specific acetoacetamide functional compound and providing coating films made therefrom with formaldehyde abatement property, yellowing resistance, and scrub resistance.

11 Claims, No Drawings

AQUEOUS COATING COMPOSITION AND PROCESS FOR PREPARING THE SAME

FIELD OF THE INVENTION

The present invention relates to an aqueous coating composition and a process for preparing the same.

INTRODUCTION

Aqueous dispersions also known as waterborne dispersions of polymers are becoming increasingly more important than solvent-based polymer dispersions for less environmental problems. There are increasingly strict environmental regulations with respect to reduce health risks from indoor exposure to air pollutants such as formaldehyde. Attempts have been made to reduce free formaldehyde released from the indoor environment. For example, aqueous acetoacetyl-group-containing polymer binders have been developed as formaldehyde abatement materials for coating applications. However, hydrolysis of the acetoacetyl groups in the polymer tends to occur in water during storage, which can cause a buildup of pressure in containers resulting in safety issues. In addition, coating films comprising these types of polymers tend to show discoloration (e.g., yellowness) over time, when exposed to sunlight, particularly upon aging of the coatings.

Therefore, it is desirable to develop an aqueous coating composition that is storage stable while providing coating films made therefrom with formaldehyde abatement property without compromising other properties including yellowing and scrub resistance.

SUMMARY OF THE INVENTION

The present invention provides an aqueous polymer composition comprising a novel combination of an anionic acrylic polymer with a small amount of a specific acetoacetamide functional compound of formula I described later. It is surprisingly found that such aqueous coating composition is storage stable and can provide coating films made therefrom with formaldehyde abatement property, yellowing resistance, and scrub resistance.

In a first aspect, the present invention is an aqueous coating composition comprising: an anionic acrylic polymer, and from 0.1% to 1.55%, by weight based on the total weight of the aqueous coating composition, of an acetoacetamide functional compound of formula (I),

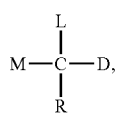
(I)

where R is hydrogen or a $C_1$-$C_6$ alkyl group; D is a group represented by Structure A; L and M are each independently hydrogen, a $C_1$-$C_6$ alkyl group, or a group represented by Structure A; wherein Structure A has the following structure,

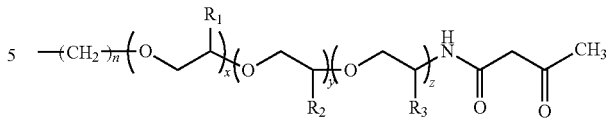
(Structure A)

where $R_1$, $R_2$, and $R_3$ are each independently hydrogen or methyl; x, y, and z are each independently an average value ranging from 0 to 50; and n is 0 or 1;
provided that the sum of x, y, and z in formula (I) is at least 2.

In a second aspect, the present invention is a process of preparing the aqueous coating composition of the first aspect. The process comprises admixing an anionic acrylic polymer with from 0.1% to 1.55%, by weight based on the total weight of the aqueous coating composition, of an acetoacetamide functional compound of formula (I),

(I)

where R is hydrogen or a $C_1$-$C_6$ alkyl group; D is a group represented by Structure A; L and M are each independently hydrogen, a $C_1$-$C_6$ alkyl group, or a group represented by Structure A; wherein Structure A has the following structure,

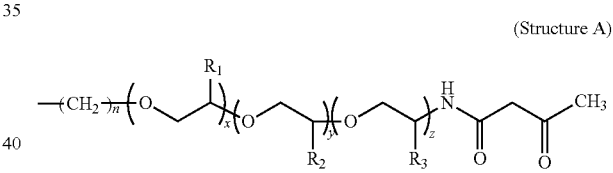
(Structure A)

where $R_1$, $R_2$, and $R_3$ are each independently hydrogen or methyl; x, y, and z are each independently an average value ranging from 0 to 50; and n is 0 or 1;
provided that the sum of x, y, and z in formula (I) is at least 2.

In a third aspect, the present invention is a method of removing aldehydes from air containing aldehydes comprising: applying the aqueous coating composition of the first aspect to a substrate, and drying, or allowing to dry, the applied aqueous coating composition to form a film.

DETAILED DESCRIPTION OF THE INVENTION

"Aqueous" composition or dispersion herein means that particles dispersed in an aqueous medium. By "aqueous medium" herein is meant water and from 0 to 30%, by weight based on the weight of the medium, of water-miscible compound(s) such as, for example, alcohols, glycols, glycol ethers, glycol esters, or mixtures thereof.

"Acrylic" as used herein includes (meth)acrylic acid, alkyl (meth)acrylate, (meth)acrylamide, (meth)acrylonitrile and their modified forms such as (meth)hydroxyalkyl acrylate. Throughout this document, the word fragment "(meth)acryl" refers to both "methacryl" and "acryl". For example, (meth)acrylic acid refers to both methacrylic acid and acrylic acid, and methyl (meth)acrylate refers to both methyl methacrylate and methyl acrylate.

"Glass transition temperature" or "$T_g$," as used herein can be measured by various techniques including, for example, differential scanning calorimetry ("DSC") or calculation by using a Fox equation. The particular values of $T_g$ reported herein are those calculated by using the Fox equation (T. G. Fox, Bull. Am. Physics Soc., Volume 1, Issue No. 3, page 123 (1956)). For example, for calculating the $T_g$ of a copolymer of monomers $M_1$ and $M_2$, $$\frac{1}{T_g(calc)} = \frac{w(M_1)}{T_g(M_1)} + \frac{w(M_2)}{T_g(M_2)},$$

wherein $T_g$(calc.) is the glass transition temperature calculated for the copolymer, $w(M_1)$ is the weight fraction of monomer $M_1$ in the copolymer, $w(M_2)$ is the weight fraction of monomer $M_2$ in the copolymer, $T_g(M_1)$ is the glass transition temperature of the homopolymer of monomer $M_1$, and $T_g(M_2)$ is the glass transition temperature of the homopolymer of monomer $M_2$, all temperatures being in K. The glass transition temperatures of the homopolymers may be found, for example, in "Polymer Handbook", edited by J. Brandrup and E. H. Immergut, Interscience Publishers.

"Structural units", also known as "polymerized units", of the named monomer, refers to the remnant of the monomer after polymerization, that is, polymerized monomer or the monomer in polymerized form. For example, a structural unit of methyl methacrylate is as illustrated:

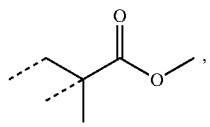

where the dotted lines represent the points of attachment of the structural unit to the polymer backbone.

The aqueous coating composition of the present invention may comprise one or more acetoacetamide functional compounds. The acetoacetamide functional compounds are useful as formaldehyde scavengers in the aqueous coating composition. The acetoacetamide functional compounds may have the structure of formula (I):

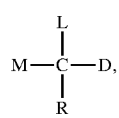
(I)

where R is hydrogen or a $C_1$-$C_6$ alkyl group; D is a group represented by Structure A; L and M are each independently hydrogen, a $C_1$-$C_6$ alkyl group, or a group represented by Structure A; wherein Structure A has the following structure,

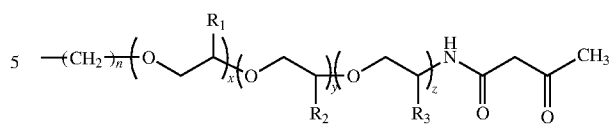
(Structure A)

where $R_1$, $R_2$, and $R_3$ are each independently hydrogen or methyl; and x, y, and z are each independently an average value ranging from 0 to 50; and n is 0 or 1; provided that the sum of x, y, and z (i.e., x+y+z) in formula (I) is at least 2, preferably, in the range of from 2.1 to 100, from 2.2 to 85, from 2.3 to 50, from 2.4 to 20, or from 2.5 to 15.

The term "$C_1$-$C_6$ alkyl" refers to an alkyl containing from 1 to 6 carbon atoms. R in formula (I) can be a $C_1$-$C_4$ alkyl group or a $C_1$-$C_2$ group. The alkyl group in M and L can independently be a $C_1$-$C_4$ alkyl group or a $C_1$-$C_2$ alkyl group.

In some embodiments, R is hydrogen or a $C_1$-$C_4$ alkyl group, preferably methyl; L is hydrogen or a $C_1$-$C_4$ alkyl group, preferably hydrogen; M is represented by Structure A, wherein n, x, y, and z are each zero; and D is represented by Structure A, wherein $R_1$ and $R_3$ are both methyl, $R_2$ is hydrogen, n is 1, y is an average value ranging from 1 to 50, preferably, ranging from 2 to 40, ranging from 2 to 20, or ranging from 2 to 10; and the sum of x and z (i.e., x+z) is from 1 to 20, from 1 to 10, from 2 to 9, or from 2 to 8.

In some further embodiments, R is hydrogen or a $C_1$-$C_4$ alkyl group, preferably methyl; L is hydrogen or a $C_1$-$C_4$ alkyl group, preferably hydrogen; M is represented by Structure A, wherein n, x, y, and z are each zero; and D is represented by Structure A, wherein $R_1$ and $R_3$ are both methyl, n is 1, y is 0, and the sum of x and z is from 2 to 70, from 2.1 to 50, from 2.2 to 35, from 2.3 to 20, or from 2.5 to 10.

In some other embodiments, R, L, and M are the same or different and each independently hydrogen or a $C_1$-$C_4$ alkyl group, preferably hydrogen; D is represented by Structure A, wherein n is 0, $R_1$ is hydrogen, $R_2$ is methyl, and z is 0. Preferably, the sum of x and y (i.e., x+y) is in the range of from 2 to 50, from 3 to 40, or from 5 to 20. The ratio of y/x is may be in the range 0.1 to 20, from 0.15 to 15, from 1.1 to 10, or from 2 to 9.

In some other embodiments, R is hydrogen or a $C_1$-$C_4$ alkyl group, preferably ethyl; and D, L, and M are the same or different and each independently represented by Structure A, wherein n is 0 or 1, $R_1$ and $R_3$ are both methyl, and y is 0; provided that the sum of x and z in formula (I) is from 2 to 100, from 3 to 90, from 4 to 85, from 5 to 50, or from 5 to 20.

The acetoacetamide functional compound useful in the present invention can be an addition reaction product of a polyether amine with a compound bearing an acetoacetyl functional group or an acetoacetyl-forming group which yields or is subsequently convertible to an acetoacetyl functional group. The acetoacetyl functional group is represented by:

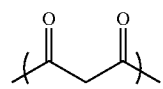

Suitable compounds bearing an acetoacetyl functional group or an acetoacetyl-forming group may include, for example, diketene, t-butyl acetoacetate, diketene-acetone adducts, or mixtures thereof. The polyether amines can be monoamines, diamines, triamines, or mixtures thereof. The polyether amines may have a molecular weight of from 200 to 5,000, from 210 to 2,000, from 250 to 1,000, from 300 to 800, or from 350 to 700, as calculated from the amount of amine moles which are determined by potassium hydroxide (KOH) titration method according to ASTM D6979-03 standard. Commercially available suitable polyether amines may include Jeffamine series, D-230, D-400, T-403, ED-600 and M-600 amines, all available from Huntsman. The mole ratio of amine groups in polyether amines to the compound bearing an acetoacetyl functional or acetoacetyl-forming group may be in the range of from 0.7:1 to 2:1, from 0.8:1 to 1.5:1, from 0.9:1 to 1.2:1, or from 1:1 to 1.1:1. The reaction of the compound bearing an acetoacetyl or acetoacetyl-forming group with the polyether amine may be conducted at temperatures ranging from −20 to 50° C., from −10 to 40° C., or from 0 to 20° C.

The aqueous coating composition of the present invention may comprise, by weight based on the total weight of the aqueous coating composition, 0.1% or more, 0.15% or more, 0.18% or more, 0.2% or more, 0.22% or more, 0.25% or more, 0.28% or more, 0.3% or more, 0.35% or more, 0.4 or more, 0.45% or more, 0.5% or more, 0.55% or more, or even 0.6% or more, and at the same time, 1.55% or less, 1.5% or less, 1.45% or less, 1.4% or less, 1.35% or less, 1.3% or less, 1.25% or less, 1.2% or less, 1.15% or less, 1.1% or less, 1.05% or less, 1.0% or less, 0.95% or less, 0.9% or less, 0.85% or less, 0.8% or less, 0.75% or less, or even 0.7% or less of the acetoacetamide functional compound.

The aqueous coating composition of the present invention may further comprise one or more anionic acrylic polymers, e.g., film-forming polymers. The anionic acrylic polymer is typically free of functional groups that are reactive with the acetoacetamide functional compound. "Acrylic polymer" herein refers to a polymer comprising structural units of one or more acrylic monomers or their mixtures with other monomers including, for example, styrene or substituted styrene. The term "anionic acrylic polymer" herein refers to acrylic polymers that bear an anionic charge between pH=1-14. The anionic acrylic polymer may comprise at least one functional group selected from a carboxylic acid, sulfonic acid, sulfonate, phosphoric acid, phosphate, phosphonic acid, or phosphonate group.

The anionic acrylic polymer useful in the present invention may comprise structural units of one or more ethylenically unsaturated ionic monomers. Examples of suitable ethylenically unsaturated ionic monomers include α, β-ethylenically unsaturated carboxylic acids including an acid-bearing monomer such as methacrylic acid, acrylic acid, itaconic acid, maleic acid, or fumaric acid; or a monomer bearing an acid-forming group which yields or is subsequently convertible to, such an acid group such as anhydride, (meth)acrylic anhydride, or maleic anhydride; sodium styrene sulfonate (SSS), sodium vinyl sulfonate (SVS), 2-acrylamido-2-methylpropanesulfonic acid (AMPS), sodium salt of 2-acrylamido-2-methyl-1-propanesulfonic acid, ammonium salt of 2-acrylamido-2-methyl-1-propane sulfonic acid; sodium salt of allyl ether sulfonate; or mixtures thereof. Preferred ethylenically unsaturated functional monomers are acrylic acid (AA), sodium styrene sulfonate (SSS), methacrylic acid (MAA), or mixtures thereof. The anionic acrylic polymer may comprise, by weight based on the weight of the anionic acrylic polymer, 0.1% or more, 0.2% or more, 0.5% or more, 0.6% or more, 0.7% or more, 0.8% or more, 0.9% or more, 1.0% or more, 1.1% or more, or even 1.2% or more, and at the same time, 20% or less, 15% or less, 10% or less, 8% or less, 6% or less, 5% or less, 4.5% or less, 4% or less, 3.5% or less, 3% or less, 2.5% or less, 2% or less, or even 1.5% or less of structural units of the ethylenically unsaturated ionic monomer.

The anionic acrylic polymer useful in the present invention may also comprise structural units of one or more ethylenically unsaturated nonionic monomers. The term "nonionic monomers" herein refers to monomers that do not bear an ionic charge between pH=1-14. Suitable examples of ethylenically unsaturated nonionic monomers include alkyl esters of (meth)acrylic acids having from 2 to 30 carbon atoms or from 2 to 18 carbon atoms such as methyl (meth) acrylate, ethyl acrylate, 2-ethylhexyl acrylate, butyl (meth) acrylate, iso-butyl (meth)acrylate, tert-butyl (meth)acrylate, decyl acrylate, isodecyl methacrylate, lauryl (meth)acrylate, and stearyl (meth)acrylate; (meth)acrylonitrile; vinyl aromatic monomers including styrene and substituted styrenes, or mixtures thereof; butadiene; ethylene, propylene, α-olefins such as 1-decene; and vinyl monomers such as vinyl acetate, vinyl butyrate, vinyl chloride, vinylidene chloride, vinyl versatate and other vinyl esters, alkylvinyldialkoxysilanes; (meth)acrylamide, monosubstituted (meth)acrylamide, N-methylacrylamide, N-ethylacrylamide, N-isopropylacrylamide, N-butylacrylamide, N-tertiary butylacrylamide, N-2-ethylhexylacrylamide, N,N-dimethylacrylamide, N,N-diethylacrylamide; hydroxy-functional alkyl (meth)acrylates such as hydroxyethyl (meth)acrylate and hydroxypropyl (meth)acrylate; ureido-functional monomers such as hydroxyethyl ethylene urea methacrylate, hydroxyethyl ethylene urea acrylate, such as SIPOMER WAM II, methylacrylamidoethyl ethylene urea; vinyltrialkoxysilanes such as vinyltriethoxysilane and vinyltrimethoxysilane; (meth)acryl functional silanes including, for example, (meth)acryloxyalkyltrialkoxysilanes such as gamma-methacryloxypropyltrimethoxysilane and methacryloxypropyltriethoxysilane; 3-methacryloxypropylmethyldimethoxysilane; 3-methacryloxypropyltrimethoxysilane; 3-methacryloxypropyltriethoxysilane; cycloalkyl (meth) acrylates including cyclohexyl (meth)acrylate, methcyclohexyl (meth)acrylate, dihydrodicyclopentadienyl (meth) acrylate, trimethylcyclohexyl (meth)acrylate, t-butyl (meth) cyclohexyl acrylate; or combinations thereof. Preferred ethylenically unsaturated nonionic monomers are butyl acrylate, butyl methacrylate, methyl methacrylate, ethyl acrylate, 2-ethylhexyl acrylate, vinyl acetate, styrene, or mixtures thereof. The anionic acrylic polymer may comprise, by weight based on the weight of the anionic acrylic polymer, from 80% to 99.9%, from 85% to 98%, or from 90% to 97% of structural units of the ethylenically unsaturated nonionic monomer.

The anionic acrylic polymer useful in the present invention may further comprise structural units of one or more multiethylenically unsaturated monomers that are different from the monomers described above. Examples of suitable multiethylenically unsaturated monomers include allyl (meth)acrylate, hexanediol di(meth)arcylate, ethylene glycol di(meth)acrylate, neopentyl glycol di(meth)acrylate, butanediol di(meth)acrylate, trimethylolpropane tri(meth) acrylate, divinyl benzene, allyl acetate, allyl (meth)acrylamide, allyl oxyethyl (meth)acrylate, crotyl (meth)acrylate, dicyclopentenyl (meth)acrylate, dicyclopentenyl ethyl (meth)acrylate, diallyl maleate, and mixtures thereof. The anionic acrylic polymer may comprise, by weight based on the weight of the anionic acrylic polymer, from zero to 5%, from 0.01% to 2%, or from 0.1% to 1%, of structural units of the multiethylenically unsaturated monomer.

The anionic acrylic polymer useful in the present invention may optionally comprise or free of structural units of one or more monomers bearing an acetoacetyl functional group. The acetoacetyl functional group is as described in the above. The monomers bearing an acetoacetyl functional group can be an ethylenically unsaturated acetoacetoxy or acetoacetamide functional monomer, for example, acetoacetoxyalkyl (meth)acrylates such as acetoacetoxyethyl methacrylate (AAEM), acetoacetoxyethyl acrylate, acetoacetoxypropyl methacrylate, acetoacetoxybutyl methacrylate, and 2,3-di(acetoacetoxy)propyl methacrylate; allyl acetoacetate; acetoacetamides; or mixtures thereof. The anionic acrylic polymer may comprise less than 2%, less than 1.8%, less than 1.5%, less than 1.2%, less than 1%, less than 0.8%, less than 0.5%, less than 0.2%, less than 0.1%, less than 0.05%, or even zero of structural units of the monomer bearing an acetoacetyl functional group.

Types and levels of the monomers described above may be chosen to provide the anionic acrylic polymer with a Tg suitable for different applications. The Tg of the anionic acrylic polymer may be in the range of from −30 to 50° C., from −20 to 40° C., from −10 to 30° C., or from −5 to 25° C., as determined by the Fox equation described above or as measured by DSC.

The anionic acrylic polymer useful in the present invention may be prepared by free-radical polymerization, preferably emulsion polymerization, of the monomers described above. Total weight concentration of the monomers used for preparing the anionic acrylic polymer is equal to 100%. The monomers may be added neat or as an emulsion in water; or added in one or more additions or continuously, linearly or nonlinearly, over the reaction period of preparing the anionic acrylic polymer. Temperature suitable for polymerization process may be lower than 100° C., in the range of from 30° C. to 95° C., or in the range of from 50° C. to 90° C. One or more surfactants may be used in preparing the polymer. The surfactant may be added prior to, during, or after the polymerization of the monomer mixture, or combinations thereof. These surfactants may include anionic and/or nonionic emulsifiers, such as, for example, phosphate surfactants, sulfates surfactants, sulfonates surfactants and succinates surfactants, polymerizable surfactants, or mixtures thereof. The surfactant used is usually from zero to 5%, from 0.5% to 3%, or from 0.8% to 2%, by weight based on the total weight of monomers used for preparing the anionic acrylic polymer.

In the polymerization process, free radical initiators and/or chain transfer agents may be used. The polymerization process may be thermally initiated or redox initiated free-radical polymerization. Examples of suitable free radical initiators include hydrogen peroxide, t-butyl hydroperoxide, cumene hydroperoxide, ammonium and/or alkali metal persulfates, sodium perborate, perphosphoric acid, and salts thereof; potassium permanganate, and ammonium or alkali metal salts of peroxydisulfuric acid. The free radical initiators may be used typically at a level of 0.01% to 3.0%, by weight based on the total weight of monomers. Redox systems comprising the above described initiators coupled with a suitable reductant may be used in the polymerization process. Examples of suitable reductants include sodium sulfoxylate formaldehyde, ascorbic acid, isoascorbic acid, alkali metal and ammonium salts of sulfur-containing acids, such as sodium sulfite, bisulfite, thiosulfate, hydrosulfite, sulfide, hydrosulfide or dithionite, acetone bisulfite, glycolic acid, hydroxymethanesulfonic acid, glyoxylic acid hydrate, lactic acid, glyceric acid, malic acid, tartaric acid and salts of the proceeding acids. Metal salts of iron, copper, manganese, silver, platinum, vanadium, nickel, chromium, palladium, or cobalt may be used to catalyze the redox reaction. Chelating agents for the metals may optionally be used. Examples of suitable chain transfer agents include 3-mercaptopropionic acid, n-dodecyl mercaptan, methyl 3-mercaptopropionate, butyl 3-mercaptopropionate, benzenethiol, azelaic alkyl mercaptan, or mixtures thereof. The chain transfer agent may be used in an effective amount to control the molecular weight of the anionic acrylic polymer, for example, from zero to 1%, from 0.1% to 0.5%, or from 0.15% to 0.4%, by weight based on the total weight of monomers used for preparing the anionic acrylic polymer.

After completing the polymerization, the obtained anionic acrylic polymer dispersion may be neutralized by one or more bases as neutralizers to a pH value, for example, at least 6, from 6 to 10, or from 7 to 9. The bases may lead to partial or complete neutralization of the ionic or latently ionic groups of the polymer. Examples of suitable bases include ammonia; alkali metal or alkaline earth metal compounds such as sodium hydroxide, potassium hydroxide, calcium hydroxide, zinc oxide, magnesium oxide, sodium carbonate; primary, secondary, and tertiary amines, such as triethyl amine, ethylamine, propylamine, monoisopropylamine, monobutylamine, hexylamine, ethanolamine, diethyl amine, dimethyl amine, tributylamine, triethanolamine, dimethoxyethylamine, 2-ethoxyethylamine, 3-ethoxypropylamine, dimethylethanolamine, diisopropanolamine, morpholine, ethylenediamine, 2-diethylaminoethylamine, 2,3-diaminopropane, 1,2-propylenediamine, neopentanediamine, dimethylaminopropylamine, hexamethylenediamine, 4,9-dioxadodecane-1,12-diamine, polyethyleneimine or polyvinylamine; aluminum hydroxide; or mixtures thereof.

The anionic acrylic polymer particles in the aqueous coating composition of the present invention may have a particle size of from 50 nanometers (nm) to 500 nm, from 80 nm to 200 nm, or from 90 nm to 150 nm. The particle size herein refers to Z-average size and may be measured by a Brookhaven BI-90 Plus Particle Size Analyzer.

The aqueous coating composition of the present invention may further comprise pigments and/or extenders. "Pigment" herein refers to a material which is capable of materially contributing to the opacity or hiding capability of a coating. Such materials typically have a refractive index greater than 1.8. Inorganic pigments typically include metal oxides. Examples of suitable pigments include titanium dioxide ($TiO_2$), zinc oxide, iron oxide, zinc sulfide, anticorrosive pigments such as zinc phosphate and zinc molybdate, carbon black, barium sulfate, barium carbonate and mixtures thereof. $TiO_2$ typically exists in two crystal forms, anastase and rutile. Suitable commercially available $TiO_2$ may include, for example, KRONOS 2310 available from Kronos Worldwide, Inc., Ti-Pure R-706 available from Chemours (Wilmington, Del.), TiONA AT1 available from Cristal, and mixtures thereof. $TiO_2$ may be also available in concentrated dispersion form. "Extender" herein refers to a particulate material having a refractive index of less than or equal to 1.8 and greater than 1.3. Examples of suitable extenders include calcium carbonate, clay, calcium sulfate, aluminum silicates, silicates, zeolites, mica, diatomaceous earth, solid or hollow glass, ceramic beads, nepheline syenite, feldspar, diatomaceous earth, calcined diatomaceous earth, talc (hydrated magnesium silicate), silica, alumina, kaolin, pyrophyllite, perlite, baryte, wollastonite, opaque polymers such as ROPAQUE™ Ultra E available from The Dow Chemical Company (ROPAQUE is a trademark of The Dow Chemical Company), and mixtures thereof. The aqueous coating composition may have a pigment volume concentration (PVC) of from zero to 80%, from 15% to 70%, or from 30% to 60%. PVC may be determined according to the following equation:

$$PVC = \frac{\text{Volume of Pigment and extender}}{\text{Dry volume of the coating composition}} \times 100\%$$

The aqueous coating composition of the present invention may further comprise one or more defoamers. "Defoamers" herein refer to chemical additives that reduce and hinder the formation of foam. Defoamers may be silicone-based defoamers, mineral oil-based defoamers, ethylene oxide/propylene oxide-based defoamers, alkyl polyacrylates and mixtures thereof. Suitable commercially available defoamers may include, for example, TEGO Airex 902 W and TEGO Foamex 1488 polyether siloxane copolymer emulsions both available from TEGO, BYK-024 silicone deformer available from BYK, and mixtures thereof. The defoamer may be present, by weight based on the total weight of the aqueous coating composition, generally in an amount of from zero to 2%, from 0.1% to 1.5%, or from 0.5% to 1%.

The aqueous coating composition of the present invention may further comprise one or more rheology modifiers, also known as "thickeners". The thickeners may include polyvinyl alcohol (PVA), clay materials, acid derivatives, acid copolymers, urethane associate thickeners (UAT), polyether urea polyurethanes (PEUPU), polyether polyurethanes (PEPU), or mixtures thereof. Examples of suitable thickeners include alkali swellable emulsions (ASE) such as sodium or ammonium neutralized acrylic acid polymers; hydrophobically modified alkali swellable emulsions (HASE) such as hydrophobically modified acrylic acid copolymers; associative thickeners such as hydrophobically modified ethoxylated urethanes (HEUR); and cellulosic thickeners such as methyl cellulose ethers, hydroxymethyl cellulose (HMC), hydroxyethyl cellulose (HEC), hydrophobically-modified hydroxy ethyl cellulose (HMHEC), sodium carboxymethyl cellulose (SCMC), sodium carboxymethyl 2-hydroxyethyl cellulose, 2-hydroxypropyl methyl cellulose, 2-hydroxyethyl methyl cellulose, 2-hydroxybutyl methyl cellulose, 2-hydroxyethyl ethyl cellulose, and 2-hydoxypropyl cellulose. Preferably, the thickener is HEUR. The thickener may be present, by weight based on the total weight of the aqueous coating composition, in an amount of from zero to 5%, from 0.2% to 4%, or from 0.5% to 3%.

The aqueous coating composition of the present invention may further comprise one or more wetting agents. "Wetting agents" herein refer to chemical additives that reduce the surface tension of a coating composition, causing the coating composition to be more easily spread across or penetrate the surface of a substrate. Wetting agents may be polycarboxylates, anionic, zwitterionic, or non-ionic. Suitable commercially available wetting agents may include, for example, SURFYNOL 104 nonionic wetting agent based on an actacetylenic diol available from Evonik, BYK-346 and BYK-349 polyether-modified siloxanes both available from BYK, or mixtures thereof. The wetting agent may be present, by weight based on the total weight of the aqueous coating composition, in an amount of from zero to 2%, from 0.2% to 1.5%, or from 0.5% to 1.3%.

The aqueous coating composition of the present invention may further comprise one or more coalescents. "Coalescents" herein refer to slow-evaporating solvents that fuse polymer particles into a continuous film under ambient condition. Examples of suitable coalescents include 2-n-butoxyethanol, dipropylene glycol n-butyl ether, propylene glycol n-butyl ether, dipropylene glycol methyl ether, propylene glycol methyl ether, propylene glycol n-propyl ether, diethylene glycol monobutyl ether, ethylene glycol monobutyl ether, ethylene glycol monohexyl ether, triethylene glycol monobutyl ether, dipropylene glycol n-propyl ether, n-butyl ether, or mixtures thereof. Preferred coalescents include dipropylene glycol n-butyl ether, ethylene glycol monobutyl ether, diethylene glycol monobutyl ether, n-butyl ether, or mixtures thereof. The coalescents may be present, by weight based on the total weight of the aqueous coating composition, from zero to 10%, from 1% to 8%, or from 2% to 7%.

The aqueous coating composition of the present invention may further comprise one or more dispersants. The dispersants can be polyacrylic acids or polymethacrylic acids or maleic anhydride with various monomers such as styrene, acrylate or methacrylate esters, diisobutylene, and other hydrophilic or hydrophobic comonomers; salts thereof; or mixtures thereof. The dispersant may be present, by weight based on the total weight of the aqueous coating composition, in an amount of from zero to 2%, from 0.2% to 1.8%, or from 0.3% to 1.5%.

In addition to the components described above, the aqueous coating composition of the present invention may further comprise any one or combination of the following additives: buffers, neutralizers, humectants, mildewcides, biocides, anti-skinning agents, colorants, flowing agents, anti-oxidants, plasticizers, leveling agents, adhesion promoters, anti-flash rust additives, anticorrosion additives, and grind vehicles. These additives may be present in a combined amount of from zero to 2%, from 0.2% to 1.6%, or from 0.3% to 1.4%, by weight based on the total weight of the aqueous coating composition.

The aqueous coating composition of the present invention may have a solids content of from 30% to 80%, from 40% to 70%, from 50% to 60%, by weight based on the total weight of the aqueous coating composition.

The aqueous coating composition of the present invention may be prepared by a process comprising: admixing the anionic acrylic polymer with the acetoacetamide functional compound, and other optional components, e.g., pigments and/or extenders as described above. Components in the aqueous coating composition may be mixed in any order to provide the aqueous coating composition of the present invention. Any of the above-mentioned optional components may also be added to the aqueous coating composition during or prior to the mixing to form the aqueous coating composition. When the aqueous coating composition comprises the pigment and/or extender, the pigments and/or extenders are preferably mixed with the dispersant to form a slurry of pigments and/or extender.

The aqueous coating composition of the present invention is useful for various applications for removal of formaldehyde (FA) including, for example, coatings, elastomers, plastics, adhesives, filter tips of cigarettes, air conditioners, and air purifiers.

The aqueous coating composition of the present invention comprising the specific combination of the acetoacetamide functional compound with the anionic acrylic polymer is storage stable, as indicated by reduced hydrolysis as compared to an incumbent aqeuous coating composition comprising an acetoacetoxy functional polymer and free of the acetoacetamide functional compound ("Incumbent Coating Composition" in Comparative Example 3 in the Examples section below). The aqueous coating composition of the present invention is useful as formaldehyde abatement materials without hydrolysis issue caused by conventional acetoacetoxy functional polymer binders. For example, the aqueous coating composition of the present invention can provide good formaldehyde abatement properties as indicated by FA efficiency ≥75%, preferably, 80% or more, 85% or more, 89% or more, or even 90% or more. The aqueous coating composition can also provide balanced properties, including acceptable scrub resistance of 70% or more, preferably, 80% or more, of that of an aqueous coating composition free of the acetoacetamide functional compound; and comparable or even reduced yellowing as compared to the Incumbent Coating Composition. These properties can be measured according to the test methods described in the Examples section below.

The aqueous coating composition of the present invention is suitable for various coating applications including, for example, marine and protective coatings, automotive coatings, traffic paints, Exterior Insulation and Finish Systems (EIFS), roof mastic, wood coatings, coil coatings, plastic coatings, powder coatings, can coatings, architectural coatings, and civil engineering coatings. The aqueous coating composition is particularly suitable for architectural coatings.

The present invention also includes a method of removing aldehydes from air containing aldehydes with the aqueous coating composition of the present invention, comprising: applying the aqueous coating composition to a substrate; and drying, or allowing to dry, the applied aqueous coating composition to form a film. After the aqueous coating composition of the present invention has been applied to a substrate, the aqueous coating composition can dry, or allow to dry, to form a film (i.e., coating) at room temperature (23±2° C.), or at an elevated temperature, for example, from 35 to 240° C.

The aqueous coating composition of the present invention can be applied to, and adhered to, various substrates. Examples of suitable substrates include wood, metals, plastics, foams, stones, elastomeric substrates, glass, fabrics, concrete, or cementitious substrates. The aqueous coating composition can be applied to a substrate by incumbent means including brushing, dipping, rolling and spraying. The aqueous coating composition is preferably applied by spraying. The standard spray techniques and equipment for spraying such as air-atomized spray, air spray, airless spray, high volume low pressure spray, and electrostatic spray such as electrostatic bell application, and either manual or automatic methods can be used.

Examples

Some embodiments of the invention will now be described in the following Examples, wherein all parts and percentages are by weight unless otherwise specified.

Styrene (ST) is available from Langyuan Chemical Co., Ltd.

Butyl acrylate (BA) and acetoacetoxyethyl methacrylate (AAEM) are available from The Dow Chemical Company.

A-19 surfactant, available from BASF, is sodium dodecyl (Linear) benzene sulfonate.

Bruggolite FF6M (FF-6) is available from Brueggemann Chemical.

Acrylic acid (AA), sodium p-styrene sulfonate (SSS), ammonium persulfate (APS), ethylene diamine tetraacetic acid (EDTA) tetrasodium salt, diketene, and tert-butyl hydroperoxide (t-BHP) are all available from Sinopharm Chemical Reagent Co., Ltd.

Silquest A-171 vinyl trimethoxy silane is available from Momentive Performance Materials.

The following polyether amines are all available from Huntsman:

| Polyether amine | Chemical structure | Molecular weight |
|---|---|---|
| Jeffamine D-230 amine | 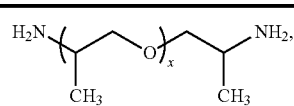 x = 2.5 | 230 |
| Jeffamine D-400 amine | 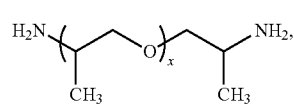 x = 6.1 | 400 |
| Jeffamine T-403 amine | 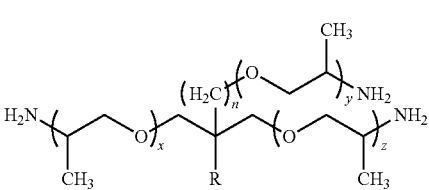 R = $C_2H_5$, n = 1, x + y + z = 5-6 | 440 |

| Polyether amine | Chemical structure | Molecular weight |
|---|---|---|
| Jeffamine ED-600 amine | $H_2N\text{-}CH(CH_3)\text{-}CH_2\text{-}[OCH_2CH(CH_3)]_x\text{-}[OCH_2CH_2]_y\text{-}[OCH_2CH(CH_3)]_z\text{-}NH_2$, $y = 9$, $x + z = 3.6$ | 600 |
| Jeffamine M-600 amine | $\text{-}[OCH_2CH(CH_3)]_X\text{-}[OCH_2CH_2]_Y\text{-}NH_2$, molar ratio propylene oxide (PO)/ethylene oxide (EO) = 9/1 | 600 |

The following standard analytical equipment and methods are used in the Examples.

Scrub Resistance Test

The scrub resistance test was conducted according to ASTM D2486-17 test method B. An aqueous coating composition was casted on a Leneta panel by using a 175 μm film caster, starting from the secured end of the panel, and then air dried in a horizontal position for 7 days in a Constant Temperature Room (25° C. and 50% relative humidity) to form coating films. The scrub test was performed on a Sheen machine Model REF903 equipped with metal accessories and nylon bristle brush. A brush was soaked in soap water overnight before use, and then mounted in brush holder with the brush's bristle-side down to start the test. Before test work, the brush was preconditioned by running it for 400 cycles on a scrub panel. After the brush precondition, a standardized scrub medium (abrasive type ASTM D2486, 10 g) was applied on the brush surface. Then the brush with scrub medium was placed in the brush holder and the test started. After each 400 cycles, additional 10 grams (g) of scrub medium was added on the brush surface. The number of cycles needed to record for remove one continuous thin line of paint film. The number of cycles for the coating composition of comparative example 2 was recorded as 100%, and the number of cycles for other examples were relative percentage values compared to that of comparative example 2. A relative percentage of 70% or higher means acceptable scrub resistance. Higher relative percentage means better scrub resistance.

Formaldehyde Abatement Efficiency of Coating Films

The formaldehyde (FA) abatement efficiency of coating films was determined according to JG/T 1074-2008 industry standard (Purificatory performance of coatings with air purification). FA efficiency requires ≥75%. The higher FA efficiency, the better FA abatement.

Yellowing Resistance Test

A coating film was formed by applying a test aqueous polymer composition on a Leneta opacity chart by using a 100 μm film caster and then dried overnight. The b value of the coating film was tested by using a color spectrophotometer and recorded as "Initial b". The coated chart was then placed in an oven at 65° C. for heatage for 14 days. The b value of the coating film after heatage was tested according to the above method and recorded as "Heatage b". The absolute value difference between Initial b and Heatage b is defined as the change of b values, Δb. The smaller Δb, the lower film yellowing.

Hydrolysis Stability of Aqueous Polymer Compositions

Acetone level of an aqueous polymer composition was used to characterize the hydrolysis degree of acetoacetyl functional groups in such aqueous polymer composition. For each test sample, at least two vials of the sample were tested for comparison: one vial was placed at 5° C. for two weeks, and then initial acetone level was measured; and another vial was placed in an oven at 50° C. for heatage for two weeks, and then the acetone level after heatage was measured and recorded as "final acetone level". The absolute value difference between the initial acetone level and the final acetone level is defined as delta acetone level, in part per million (ppm). Both the initial acetone level and the final acetone level were measured by Headspace Gas Chromatography-Flame Ion Detector (GC-FID) as follows, For each test aqueous polymer composition sample, 2 g of the samples were weighed and put into the GC vessel to run headspace GC to test the acetone concentration in the samples. The oven in the headspace (Agilent G1888 Headspace Sampler) was set at 40° C. (vial equilibration time: 60 minutes). GC-FID conditions were as follows: Instrument: Agilent 6890N Gas Chromatography system with DB-5 column (30 m×0.32 mm ID×1.0 μm film); Carrier flow: Helium carrier gas at 2.0 ml/min constant flow; Oven: 40° C., holding for 5 min, 15° C./min ramp to 250° C., holding for 0 min, total run time: 19 min; Inlet (Injector temp: 200° C., Split ratio: 5:1; Temperature: 250° C., $H_2$ flow: 40 mL/min, Air flow: 450 mL/min, and makeup flow: 45 mL/min.

Synthesis of FA Additive 1 (FA-1)

Jeffamine D-230 (0.1 mole) and deionized (DI) water (30 g) were added into a 150 mL reactor with a magnetic stirrer. The reactor was cooled around 0° C. in an ice bath. Then diketene (15.96 g, 0.19 mole) was fed into the reactor over 120 minutes (min) and the reactor temperature was kept below 15° C. After completion of the diketene feed, the reactor temperature was maintained at room temperature for 60 min to get FA-1 solution with an active component of 50%.

Synthesis of FA Additive 2 (FA-2)

Jeffamine D-400 (0.1 mole) and DI water (56 g) were added into a 150 mL reactor with a magnetic stirrer. The reactor was cooled around 0° C. in an ice bath. Then diketene (15.96 g, 0.19 mole) was fed into the reactor over 120 min and the reactor temperature was kept below 15° C. After completion of the diketene feed, the reactor temperature was maintained at room temperature for 60 min to get FA-2 solution with an active component of 50%.

Synthesis of FA Additive 3 (FA-3)

Jeffamine ED-600 (0.1 mole) and DI water (76 g) were added into a 150 mL reactor with magnetic stirrer. The reactor was cooled around 0° C. in an ice bath. Then diketene (15.96 g, 0.19 mole) was fed into the reactor over 120 min and the reactor temperature was kept below 15° C. After completion of the diketene feed, the reactor temperature was maintained at room temperature for 60 min to get FA-3 solution with an active component of 50%.

Synthesis of FA Additive 4 (FA-4)

Jeffamine T-403 (0.1 mole) and DI water (64 g) were added into a 150 mL reactor with magnetic stirrer. The reactor was cooled around 0° C. in an ice bath. Then diketene (23.94 g, 0.285 mole) was fed into the reactor over 120 min and the reactor temperature was kept below 15° C. After completion of the diketene feed, the reactor temperature was maintained at room temperature for 60 min to get FA-4 solution with an active component of 50%.

Synthesis of FA Additive 5 (FA-5)

Jeffamine M-600 (0.1 mole) and DI water (68 g) were added into a 150 mL reactor with a magnetic stirrer. The reactor was cooled around 0° C. in an ice bath. Then diketene (7.98 g, 0.095 mole) was fed into the reactor over 120 min and the reactor temperature was kept below 15° C. After completion of the diketene feed, the reactor temperature was maintained at room temperature for 60 min to get FA-5 solution with an active component of 50%.

Synthesis of Anionic Acrylic Polymer 1

A monomer emulsion was prepared by mixing BA (1060 g), ST (670 g), AA (36.2 g), SSS (6.48 g), A-171 (5.53 g), A-19 (98.59 g, 19% active), and DI water (450 g) and emulsified with stirring. Next, DI water (760 g) and A-19 (9.75 g, 19% active) were charged to a five liter multi-neck flask fitted with mechanical stirring. The contents of the flask were heated to 90° C. under a nitrogen atmosphere. To the stirred flask, the monomer emulsion (70 g), $FeSO_4 \cdot 7H_2O$ (0.0277 g), EDTA tetrasodium salt (0.0108 g) in DI water (7 g), and APS (6.37 g) in DI water (18.5 g) were added to the flask. The remaining monomer emulsion, APS (2.57 g) in DI water (77 g), sodium bisulfate (2.73 g) in DI water (77 g) were added gradually over 120 minutes. The contents of the flask were maintained at 88° C. for 30 min. Then the contents of the flask were cooled to 70° C., followed by feeding t-BHP (4.22 g, 70% active) in water (37 g) and FF-6 (2.17 g) in water (37 g) into the flask over 40 minutes. The contents of the flask were cooled to room temperature. Finally, TERGITOL 15-S-40 surfactant (12.75 g, 70% active) and sodium hydroxide (6.66 g) in DI water (90 g) were fed into the flask over 15 minutes to obtain the anionic acrylic polymer 1 with a solids content of 48% and a particle size of 130 nm.

Synthesis of Anionic Acrylic Polymer 2

A monomer emulsion was prepared by mixing BA (1024 g), ST (634 g), AA (36.2 g), SSS (6.48 g), A-171 (5.53 g), AAEM (70.97 g), A-19 (98.59 g, 19% active), and DI water (450 g), and emulsified with stirring. Next, DI water (760 g) and A-19 (19% active, 9.75 g) were charged to a five liter multi-neck flask fitted with mechanical stirring. The contents of the flask were heated to 90° C. under nitrogen atmosphere. To the stirred flask, the monomer emulsion (70 g), $FeSO_4 \cdot 7H_2O$ (0.0277 g), EDTA tetrasodium salt (0.0108 g) in DI water (7 g), and APS (6.37 g) in DI water (18.5 g) were added to the flask. The remainder of the monomer emulsion, APS (2.57 g) in DI water (77 g), and sodium bisulfate (2.73 g) in DI water (77 g) were added gradually over 120 minutes. The contents of the flask were maintained at 88° C. for 30 minutes. The contents of the flask were cooled to 70° C., following by feeding t-BHP (4.22 g, 70% active) in water (37 g) and FF-6 (2.17 g) in water (37 g) into the flask over 40 minutes. The contents of the flask were cooled to room temperature. Then, TERGITOL 15-S-40 surfactant (12.75 g, 70% active) and sodium hydroxide (6.66 g) in DI water (90 g) were fed into the flask over 15 minutes. Finally, monoethanolamine (MEA) (20.3 g) in DI water (23 g) was added as over 15 minutes to obtain the anionic acrylic polymer 2 with a solids content of 48% and a particle size of 130 nm.

Stability properties of the above obtained FA additives in combination of the anionic acrylic polymer 1 was evaluated in comparison with the anionic acrylic polymer 2 prepared by using AAEM, according to the hydrolysis stability test method described above. As shown in Table 1, using FA additives in combination of the anionic acrylic polymer 1 demonstrated significantly better hydrolysis stabilities as indicated by lower acetone level after 2-week heatage at 50° C. than the anionic acrylic polymer 2 prepared from AAEM.

TABLE 1

Stability properties (hydrolysis stability test)

| Sample | Delta acetone level after 2-week heatage (50° C.) |
|---|---|
| Admixture of FA-1 (11 g) and anionic acrylic polymer 1 (320 g) | 50 ppm |
| Admixture of FA-2 (15.2 g) and anionic acrylic polymer 1 (320 g) | 40 ppm |
| Admixture of FA-2 (30 g) and anionic acrylic polymer 1 (320 g) | 75 ppm |
| Admixture of FA-3 (20.6 g) and anionic acrylic polymer 1 (320 g) | 65 ppm |
| Admixture of FA-4 (12.8 g) and anionic acrylic polymer 1 (320 g) | 1 ppm |
| Admixture of FA-5 (20 g) and anionic acrylic polymer 1 (320 g) | 60 ppm |
| Admixture of FA-4 (6.4 g) and anionic acrylic polymer 1 (320 g) | 1 ppm |
| Admixture of FA-4 (2 g) and anionic acrylic polymer 1 (320 g) | 0 ppm |
| Admixture of FA-4 (20 g) and anionic acrylic polymer 1 (320 g) | 2 ppm |
| Admixture of FA-4 (40 g) and anionic acrylic polymer 1 (320 g) | 3 ppm |
| Anionic acrylic polymer 1 | 0 ppm |
| Anionic acrylic polymer 2 | 325 ppm |

Coating Compositions of Examples (Exs) 1-9 and Comparative (Comp) Exs 1-3

The above obtained anionic acrylic polymer 1 and anionic acrylic polymer 2 was used as binders in preparing coating compositions, based on formulations given in Table 1. Ingredients in the grind stage were mixed using a high speed Cowles disperser at a speed of 1,000 revolutions per minute (rpm). Then ingredients in the letdown stage were added and mixed by a conventional agitator at a speed of 500 rpm. The amount of water added in each coating composition was adjusted to make the total amount of the coating composition equal to 1,000 g. Types of the binder, and types and dosage of the FA additives are given in Table 2. Properties of the resultant coating compositions were evaluated according to the test methods described above and results are given in Table 2.

TABLE 1

Coating Compositions

| Material | Supplier | gram |
| --- | --- | --- |
| Grind stage | | |
| Water | | 210.00 |
| Natrosol 250 HBR hydroxyethyl cellulose (HEC) | Ashland Company | 3.00 |
| Sodium hydroxide (15%) | Sinopharm Chemical Reagent Co., Ltd. | 1.50 |
| Nopco NXZ defoamer | San Nopco Ltd. | 1.00 |
| OROTAN ™ 1288 dispersant | The Dow Chemical Company | 6.00 |
| TERGITOL ™ 15-S-40 surfactant | The Dow Chemical Company | 3.00 |
| Ti-Pure R-706 titanium dioxide | Chemour Company | 210.00 |
| DB-80 kaolin | Guangfu Building Materials Group | 50.00 |
| MCP-902 kaolin | Guangzhou Lingsheng Chemical Co., Ltd. | 50.00 |
| CC-700 calcium carbonate | Guangfu Building Materials Group | 50.00 |
| Celite 499 diatomite | IRI New Materials Ltd. | 10.00 |
| BIOBAN ZP38 biocide | DuPont Company | 4 |
| Letdown stage | | |
| Binder | Anionic acrylic polymer as prepared | 320.00 |
| FA additive | FA additives (FA-1 to FA-5) | |
| Coasol 290 Plus coalescent | Chemoxy International Ltd. | 4.92 |
| ACRYSOL ™ TT-935 rheology modifier | The Dow Chemical Company | 3.40 |
| Nopco NXZ defoamer | San Nopco Ltd. | 1.00 |
| Water | | |
| ROPAQUE ™ Ultra E opaque polymer | The Dow Chemical Company | 40.00 |
| Total amount | | 1000 |

*OROTAN, TERGITOL, ACRYSOL, and ROPAQUE are trademarks of The Dow Chemical Company.

As shown in Table 2, the coating compositions of Exs 1-9 showed comparable FA efficiency and yellowing resistance, and acceptable scrub resistance, as compared to the coating composition of Comp Ex 3. Moreover, the coating composition comprising FA-5 (Ex 6) provided coating films with more balanced properties of yellowing resistance, FA efficiency and scrub resistance than coating compositions comprising similar amounts of other FA additives such as FA-3 (Ex 4) and FA-4 (Ex 9). In contrast, the coating composition of Comp Ex 1 comprising 2% of FA-4 didn't provide coatings with acceptable scrub resistance.

TABLE 2

Coating compositions and properties

| Coating composition | Binder | Type & dosage of FA solution | FA content* | FA efficiency | Yellowing resistance (Ab) | Scrub resistance |
|---|---|---|---|---|---|---|
| Ex 1 | Anionic acrylic polymer 1 | FA-1 solution (11 g) | 0.55% | 91% | 0.3 | 84% |
| Ex 2 | Anionic acrylic polymer 1 | FA-2 solution (15.2 g) | 0.76% | 92% | 0.26 | 105% |
| Ex 3 | Anionic acrylic polymer 1 | FA-2 solution (30 g) | 1.5% | 89% | 0.36 | 83% |
| Ex 4 | Anionic acrylic polymer 1 | FA-3 solution (20.6 g) | 1.03% | 93% | 0.27 | 88% |
| Ex 5 | Anionic acrylic polymer 1 | FA-4 solution (12.8 g) | 0.64% | 93% | 0.3 | 79% |
| Ex 6 | Anionic acrylic polymer 1 | FA-5 solution (20 g) | 1.0% | 95% | 0.06 | 107% |
| Ex 7 | Anionic acrylic polymer 1 | FA-4 solution (6.4 g) | 0.32% | 88% | 0.3 | 88% |
| Ex 8 | Anionic acrylic polymer 1 | FA-4 solution (2 g) | 0.1% | 87% | 0.16 | 99% |
| Ex 9 | Anionic acrylic polymer 1 | FA-4 solution (20 g) | 1.0% | 90% | 0.29 | 70% |
| Comp Ex 1 | Anionic acrylic polymer 1 | FA-4 solution (40 g) | 2% | 92% | 0.33 | 56% |
| Comp Ex 2 | Anionic acrylic polymer 1 | None | 0 | 31% | 0.02 | 100% |
| Comp Ex 3 | Anionic acrylic polymer 2 | None | 0 | 93% | 0.37 | 133% |

*by weight based on the total weight of coating composition

What is claimed is:

1. An aqueous coating composition comprising:

an anionic acrylic polymer, and from 0.1% to 1.55%, by weight based on the total weight of the aqueous coating composition, of an acetoacetamide functional compound having the structure of formula (I),

(I)

where R is hydrogen or a $C_1$-$C_6$ alkyl group; D is a group represented by Structure A; L and M are each independently hydrogen, a $C_1$-$C_6$ alkyl group, or a group represented by Structure A; wherein Structure A has the following structure,

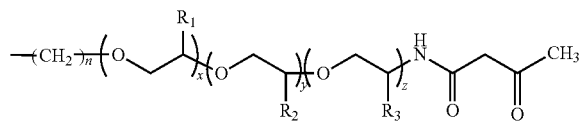

(Structure A)

where $R_1$, $R_2$, and $R_3$ are each independently hydrogen or methyl; x, y, and z are each independently an average value ranging from 0 to 50; and n is 0 or 1;

provided that the sum of x, y, and z in formula (I) is at least 2.

2. The aqueous coating composition of claim 1, wherein R is hydrogen or a $C_1$-$C_4$ alkyl group; L is hydrogen or a $C_1$-$C_4$ alkyl group; M is represented by Structure A, wherein n, x, y, and z are each zero; and D is represented by Structure A, wherein $R_1$ and $R_3$ are both methyl, $R_2$ is hydrogen, n is 1, y is an average value ranging from 1 to 50, and the sum of x and z is from 1 to 20.

3. The aqueous coating composition of claim 1, wherein R is hydrogen or a $C_1$-$C_4$ alkyl group; L is hydrogen or a $C_1$-$C_4$ alkyl group; M is represented by Structure A, wherein n, x, y, and z are each zero; and D is represented by Structure A, wherein $R_1$ and $R_3$ are both methyl, n is 1, y is 0, and the sum of x and z is from 2 to 70.

4. The aqueous coating composition of claim 1, wherein R is hydrogen or a $C_1$-$C_4$ alkyl group; and D, L, and M are each independently represented by Structure A, wherein n is 0 or 1, $R_1$ and $R_3$ are both methyl, and y is 0; provided that the sum of x and z in formula (I) is from 2 to 100.

5. The aqueous coating composition of claim 1, wherein R, L, and M are each hydrogen; and D is represented by Structure A, wherein n is 0, $R_1$ is hydrogen, $R_2$ is methyl, z is 0, and the sum of x and y is in the range of from 2 to 50.

6. The aqueous coating composition of claim 5, wherein the ratio of y/x is in the range 0.1 to 20.

7. The aqueous coating composition of claim 1, wherein the acetoacetamide functional compound is present in an amount of from 0.3% to 1.2%, by weight based on the total weight of the aqueous coating composition.

8. The aqueous coating composition of claim 1, further comprising an additive selected from the group consisting of a pigment, a reology modifier, an extender, or mixtures thereof.

9. A process for preparing the aqueous coating composition of claim 1, comprising admixing the anionic acrylic polymer with the acetoacetamide functional compound

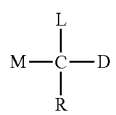

5

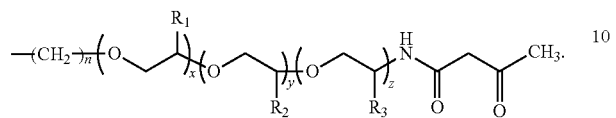

10

10. The process of claim 9, wherein the acetoacetamide functional compound is a reaction product of a polyether amine with a compound bearing an acetoacetyl functional group or an acetoacetyl-forming group.

11. A method of removing aldehydes from air containing aldehydes comprising: applying the aqueous coating composition of claim 1 to a substrate, and drying, or allowing to dry, the applied aqueous coating composition to form a film.

* * * * *